(12) United States Patent
Casey et al.

(10) Patent No.: US 7,168,707 B2
(45) Date of Patent: *Jan. 30, 2007

(54) METHOD FOR SEALING THREADED PIPE JOINTS

(75) Inventors: Tadgh Eisirt Casey, Lucan (IE); Francis Richard Martin, Templeogue (IE); Ellen Patricia Cullen, Portmarnock (IE); Philip Malcolm Regan, Drunen (NL)

(73) Assignee: Loctite (R&D) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,877

(22) Filed: Sep. 10, 2003

(65) Prior Publication Data

US 2004/0070154 A1    Apr. 15, 2004

Related U.S. Application Data

(63) Continuation of application No. 10/157,403, filed on May 29, 2002, now Pat. No. 6,688,607, which is a continuation of application No. 09/402,730, filed as application No. PCT/IE98/00029 on Apr. 17, 1998, now abandoned.

(30) Foreign Application Priority Data

Apr. 18, 1997   (IE)   ........................ 970291

(51) Int. Cl.
F16L 17/00    (2006.01)
(52) U.S. Cl. ..................... 277/314; 277/608
(58) Field of Classification Search ......... 277/602–608
See application file for complete search history.

(56) References Cited

U.S. PATENT DOCUMENTS

| 657,250 | A | | 9/1900 | Pratt |
|---|---|---|---|---|
| 3,587,840 | A | | 6/1971 | Hultberg |
| 3,727,798 | A | | 4/1973 | Harschel |
| 3,878,031 | A | | 4/1975 | Dormer |
| 3,893,496 | A | * | 7/1975 | Wallace et al. ............. 411/258 |
| 3,955,673 | A | | 5/1976 | Fosness |
| 4,012,273 | A | * | 3/1977 | Inka ........................... 156/490 |
| 4,311,760 | A | | 1/1982 | Kalinowski et al. |
| 4,431,698 | A | | 2/1984 | Case et al. |
| 4,451,534 | A | | 5/1984 | Akagi et al. |
| 4,542,863 | A | * | 9/1985 | Larson ....................... 242/423 |
| 4,546,880 | A | | 10/1985 | Reese |
| 4,582,196 | A | | 4/1986 | Hughson |
| 4,606,134 | A | | 8/1986 | Flick |

(Continued)

FOREIGN PATENT DOCUMENTS

DE          2900446      *   8/1979

(Continued)

OTHER PUBLICATIONS

S.I. Gringauz, "Plumbing", Kysshaya Shkola Publishing House, Moscow, 1975, pp. 127-128.

Primary Examiner—Vishal Patel
(74) Attorney, Agent, or Firm—Steven C. Bauman

(57) ABSTRACT

A material for sealing threaded pipe joints includes a multifilament yarn ready-coated with a joint sealing composition. The material is packaged in a dispenser from which the coated yarn may be supplied for direct application to a threaded area of a pipe.

16 Claims, 2 Drawing Sheets

U.S. PATENT DOCUMENTS

| | | | |
|---|---|---|---|
| 4,705,722 A * | 11/1987 | Ueda et al. | 428/365 |
| 4,770,448 A * | 9/1988 | Strickland et al. | 285/333 |
| 4,796,783 A | 1/1989 | Paulson | |
| 4,844,373 A | 7/1989 | Fike, Sr. | |
| 4,934,523 A | 6/1990 | Strom | |
| 4,958,733 A | 9/1990 | Masuda | |
| 4,994,303 A | 2/1991 | Calkins | |
| 4,999,389 A | 3/1991 | Ariammejad | |
| 5,068,265 A | 11/1991 | Casey et al. | |
| 5,127,783 A | 7/1992 | Moghe et al. | |
| 5,172,841 A * | 12/1992 | Friedman | 225/42 |
| 5,230,937 A | 7/1993 | Effenberger et al. | |
| 5,263,585 A | 11/1993 | Lawhon | |
| 5,282,563 A | 2/1994 | Oliver et al. | |
| 5,299,723 A | 4/1994 | Hempel | |
| 5,357,990 A | 10/1994 | Suhonen et al. | |
| 5,398,975 A | 3/1995 | Simmons | |
| 5,407,071 A | 4/1995 | Lawhon | |
| 5,413,127 A | 5/1995 | Hill | |
| 5,490,722 A | 2/1996 | Sonnett et al. | |
| 5,560,377 A | 10/1996 | Donovan | |
| 5,606,134 A | 2/1997 | Strieber | 73/849 |
| 5,607,050 A | 3/1997 | Dolan et al. | |
| 5,609,708 A | 3/1997 | Suggs et al. | |
| 5,649,659 A | 7/1997 | Saunders | |
| 5,672,641 A | 9/1997 | Beer et al. | |
| 5,765,740 A | 6/1998 | Ferguson | |
| 5,804,290 A * | 9/1998 | Marini et al. | 428/220 |
| 5,806,666 A | 9/1998 | Chiang et al. | |
| 6,051,314 A | 4/2000 | Girgis | |
| 6,012,050 A | 8/2000 | Marcon | |
| 6,103,375 A | 8/2000 | Birnholz et al. | |
| 6,547,177 B2 * | 4/2003 | Fitzpatrick | 242/439.1 |

FOREIGN PATENT DOCUMENTS

| | | |
|---|---|---|
| GB | 956089 | 4/1964 |
| JP | 362228758 | 10/1987 |
| WO | PCT/EP95/04720 | 11/1995 |

* cited by examiner

METHOD FOR SEALING THREADED PIPE JOINTS

CROSS REFERENCE TO RELATED APPLICATIONS

The present application is a continuation of U.S. application Ser. No. 10/157,403, filed May 29, 2002, which is a continuation of U.S. application Ser. No. 09/402,730, filed Oct. 12, 1999 now abandoned, which is a U.S. National Stage of International Application No. PCT/IE98/00029, filed Apr. 17, 1998, which claims priority to Ireland Application No. 970291, filed Apr. 18, 1997, all of which are incorporated herein by reference.

BACKGROUND OF THE INVENTION

1. Field of the Invention

This invention relates to material for sealing threaded pipe joints, particularly for use in the plumbing industry for making joints in pipes for water-supply, water-discharge, heating and the like, but also having utility for other types of pipework, e.g., in industrial plants. The invention also relates to a dispenser for the material.

2. Brief Description of the Related Technology

It is well known for plumbers to use a two-part system of hemp fibre and paste for sealing threaded pipe fittings. Dry hemp fibre is usually supplied in loose unwoven form, and a quantity is taken and drawn out into a length. Hemp is also available in the form of a hank wound on a spool which can be held in a dispenser with a tubular dispensing guide for the hemp. In either case, a length of hemp is wrapped around the threaded area of a male pipe fitting. The paste may be applied to the fitting first, in which case the hemp is drawn through the paste as it is wrapped around the fitting, or alternatively (or in addition) the paste is applied over the hemp. The paste keeps the hemp in place on the male threaded fitting. The female threaded fitting is then applied and completes the joint. The joint can be adjusted later, if desired.

While this two-part system is widely used, it is not acceptable for pipes intended to carry drinking water because hemp does not meet the standards for materials in contact with potable water. Hemp is capable of supporting microbiological growth.

An alternative two-part system is available using polypropylene fibre instead of hemp, which system is approved for contact with potable water. However any two-part system has disadvantages because it is cumbersome to use and requires a high degree of skill and takes time to apply.

Another commercially available sealing material is a polytetrafluoroethylene ("PTFE") tape which is non-fibrous in nature. It is typically about 10 mm wide and 0.25–0.5 mm thick. In use, the tape is wound around the threaded area of a male fitting, with a number of overlaps used to build up a thickness as desired. The female threaded part is then applied to complete the assembly. This system also requires skill in application and it suffers the disadvantage that it cannot be used in a joint where readjustment may be necessary without loss in seal.

Georg Fischer Rohrverbindungstechnik GmbH of D-78224 Singen, Germany, offers for sale a range of The cap materials including pastes for use with hemp and also including a product called PARALIQ PM 35 VLIES which comprises a tape in the form of a synthetic special web, fleece or gauze saturated with a thread sealing paste. It is fibrous in nature like hemp and can be used without either hemp or a separate paste. The tape is 16 mm wide and is available in a roll of tape 10 m or 25 m long. The 25 m tape is said to be sufficient for 100 1 inch (25 mm) threads (i.e. threads on pipe of 1 inch (25 mm) outside diameter). The broad tape is less convenient for the plumber to handle than fibrous hemp or a yarn. It is applied across a number of threads in a band 16 mm wide rather than being wound into individual threads. It is supplied on a roll but not in a dispenser which can be handled by the plumber in one hand.

In a different technical field, dental floss is available in the form of a multifilament yarn, optionally waxed, which is wound on a spool and held in a dispenser with a dispensing aperture. A blade for cutting the yarn is located on the exterior of the dispenser, adjacent to the dispensing aperture, for cutting the yarn into desired lengths. Dental floss is not (1) a sealing material or (2) coated with a composition suitable for sealing pipe joints. Accordingly, dental floss does not provide teaching relevant to the field of threaded pipe joints.

SUMMARY OF THE INVENTION

The present invention provides, as an article of manufacture, a material for sealing threaded pipe joints comprising a multifilament yarn ready-coated with a joint sealing composition and packaged in a dispenser from which the coated yarn may be supplied for direct application to a screw-threaded area of a pipe.

The material according to the invention is more convenient to use than prior art systems. The yarn is easy to wind on to the threaded area of a pipe and it enters into the well of the screw-thread. The material can be handled by a plumber in one hand.

The term "yarn" as used in this description and the following claims includes a "thread".

The dispenser may suitably be hermetically sealed prior to its initial use, e.g., by use of a hermetic envelope around it. Desirably also the dispenser has an aperture for dispensing the coated yarn and closure means for closing over the aperture when the dispenser is not in use; such closure means should re-seal the dispenser in a sufficiently airtight manner to allow a shelf life of at least one week, preferably at least one month, after initial opening of the package, without substantial deterioration of the sealing composition.

In one aspect of the invention, the sealing composition may suitably be a non-curing paste composition, for example of the type known for use with hemp in a two-part system for pipe sealing, or an oleoresinous caulk or putty similar to a glazing putty. Such compositions are packaged in sealed conditions to prevent contamination and to minimize exposure to air which could cause deterioration of the composition, for example by drying out (volatilization) or oxidation. The packaging should desirably be air-impermeable and suitably may be such that the sealing composition coated onto the yarn has a shelf life of more than 2 years without significant loss of quality.

Suitable non-curing paste compositions comprise a mixture of oil and particulate filler. The oil may suitably be an unsaturated oil (e.g., linseed oil). The particulate filler may suitably be selected from one or more of mineral fillers (e.g., calcium carbonate), powdered polymer fillers (e.g., polyethylene powder or polytetrafluoroethylene powder) and chopped fibre fillers (e.g., chopped aramid fibres, polyethylene fibres or carbon fibres, particularly aramid fibre pulp as described in U.S. Pat. No. 5,068,265 assigned to Loctite, the contents of which are incorporated herein by reference). Mixtures of two or more types of filler may be used. The filler gives the oil body to form the paste. Increased amounts of filler are used to increase the viscosity of the composition. Typical compositions comprise oil and filler in proportions of 20–40 parts by weight oil and 80–60 parts by weight filler. The composition may also contain other resins or plasticizers to aid the composition to adhere to the yarn.

However, a joint sealing composition based on linseed oil has some disadvantages including limited shelf stability due to the tendency of linseed oil to oxidize. This results in drying-out of the composition. As already described, sealed packaging can be used to minimize this problem, but special packaging increases the cost of the final product. Also the composition may dry out too quickly after the package has been opened for use. In addition, linseed oil has been found to leave a residual taste in potable water as result of leaching of oil from the joint sealing composition.

It is desirable therefore in some circumstances to use a non-curing oil other than linseed oil. Silicone oils and minerals oils are two groups of suitable non-curing oils. Silicone oils may in particular be liquid polydimethyl siloxanes such as are listed under CAS Registry Number 63148-62-9. They may suitably have a viscosity in the range from 1,000 mPas to 100,000 mPas and a molecular weight in the range from 10,000 to 500,000. Examples of suitable silicone oils include hydroxyl-terminated polydimethyl siloxane such as Silopren E2 from Bayer A. G. or methyl-terminated polydimethyl siloxane such as Silopren W1000, also from Bayer A. G.

Mineral oils may also be used instead of linseed oil. Mineral oils are generally high molecular weight liquid hydrocarbons and are listed under CAS Registry Number 8012-95-1. A suitable example is liquid paraffin. Other suitable examples include Risella oil and Ondina oil from Shell Chemical Company.

The non-curing paste composition desirably has a viscosity in the range from 20,000 mPas to 500,000 mPas, particularly from 50,000 mPas to 100,000 mPas.

The advantages of a non-curing composition are (i) that it can be made up without any reactive chemicals and therefore will have minimal toxic effect so that it is suitable for use in systems where food contact approval is necessary, and (ii) that the sealed pipe joint remains adjustable after application of the sealing material without risk of breaking the seal. Furthermore a non-curing composition based on a silicone oil or a mineral oil may have a satisfactory shelf life without being hermetically sealed.

In an alternative aspect of the invention, the sealing composition may be a curable polymeric composition, more particularly an anaerobic composition, for example an anaerobic thread sealing composition of known type (see U.S. Pat. Nos. 4,180,640 and 4,243,578 assigned to Loctite). Such a composition may suitably comprise one or more reactive monomers (especially poly-and mono-functional acrylate and methacrylate esters), fillers, stabilizers and curative ingredients. The advantage with a curable composition is that the mechanical strength of the pipe joint can be varied by varying the ingredients of the composition, depending upon the particular application needs and end use of the pipe. In general a material utilizing a curable sealing composition is not primarily intended for use by plumbers but is suitable for sealing joints in other types of pipework, e.g., industrial plants.

In the case of a curable sealing composition, the coated yarn will desirably be packaged in a dispenser or other container or packaging which minimizes curing of the composition before use. In the case of an anaerobic sealing composition, the composition will desirably remain in contact with air or oxygen prior to use.

According to one aspect of the invention, a dispenser of material for sealing threaded pipe joints comprises a hollow body, a cap portion having a dispensing aperture therein and closure means for closing over the aperture when the dispenser is not in use, wherein a multifilament yarn ready-coated with a pipe-joint sealing composition is contained in the body.

The multifilament yarn is in generally cylindrical elongate form, e.g., as a single strand, which distinguishes it from a web or fleece or gauze. The yarn is suitably of natural fibrous material or of a synthetic polymer, preferably polyamide (e.g., nylon) or polypropylene. Multifilament yarns as used in dental floss may be suitable [see e.g. U.S. Pat. No. 5,560,377 (Donovan), the contents of which are incorporated herein by reference], provided that the yarn has the ability to take up the sealing composition. Suitable yarn should be sufficiently soft and pliable to wind around the threaded part of the pipe and sufficiently absorbent to take up the sealing composition and yet sufficiently strong to tolerate the winding action around the threads on the male component and the screwing-on of the female threaded component, which can cut into and shred an unsuitable yarn. One of the primary functions of the yarn is to act as a jammer in the pipe joint and to give mechanical strength to the threaded assembly. The yarn may also have a property of absorbing water, which can result in some swelling of the material in the joint and effect a better seal. If the sealing material is to be used in contact with food, particularly potable water, then the yarn will desirably be of non-toxic fibre.

The yarn may suitably be spun or may comprise interwoven and/or entangled filaments or threads. It is preferably in a form comparable to string or twine. It may be in the "dtex" range of 500 to 5,000 (i.e., 500 gm to 5,000 gm weight per 10,000 metres of yarn), more particularly in the "dtex" range of 900 to 2,500. The decitex or "dtex" is the metric unit for fibre diameter, being the weight in grams of 10,000 m of filament (Encyclopedia of Polymer Science and Engineering, 2nd Edition, Vol. 10, p. 209). With a heavier material, e.g. 2,100 dtex, a smaller number of windings on the pipe thread are required to effect a seal as compared to a lighter material, e.g., 970 dtex.

The uncoated yarn is ordinarily supplied on a spool and the yarn is then coated by conventional methods to an acceptable loading with the sealing composition. An acceptable loading is one, which provides an amount of sealing composition on the yarn effective to seal a threaded pipe joint. The loading may suitably be in the range of 30–70% w/w (more particularly 40–65% w/w) sealing composition on 70–30% w/w (more particularly 60–35% w/w) yarn. The yarn may have an external coating of the sealing composition or it may be impregnated or saturated with the composition. This coated yarn is usually then wound back onto smaller spools for use by the plumber or other end user. Each small spool desirably is housed in a sealed dispenser or is stored in sealed packaging for transfer into a dispenser when required for use.

For short-term use, for example for trials, the yarn coated with a linseed-oil based composition may be wound on a roll with a cylindrical cover which encloses the coated yarn on the roll but does not necessarily provide an air-tight seal. This roll and cover may itself be sealed in an air-tight package until it is required for use.

In another alternative aspect of the invention, the coated yarn is not wound on a spool or roll but is wound inside the housing of a dispenser.

BRIEF DESCRIPTION OF THE FIGURES

Two embodiments of dispensers for use in the present invention will now be described with reference to the accompanying drawings, in which.

DETAILED DESCRIPTION OF THE INVENTION

Figure 1:
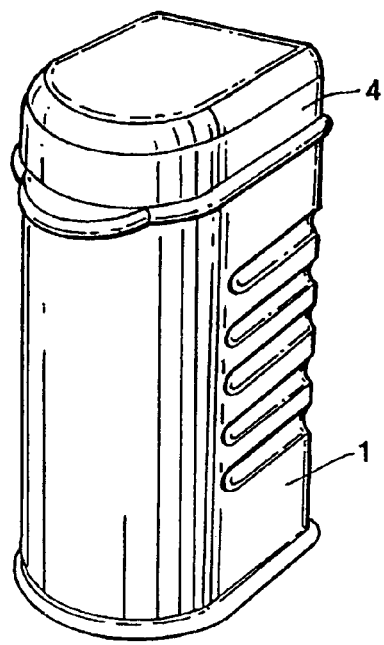
FIG. 1 is a perspective view of a first embodiment of a dispenser in the closed position.
Figure 2:
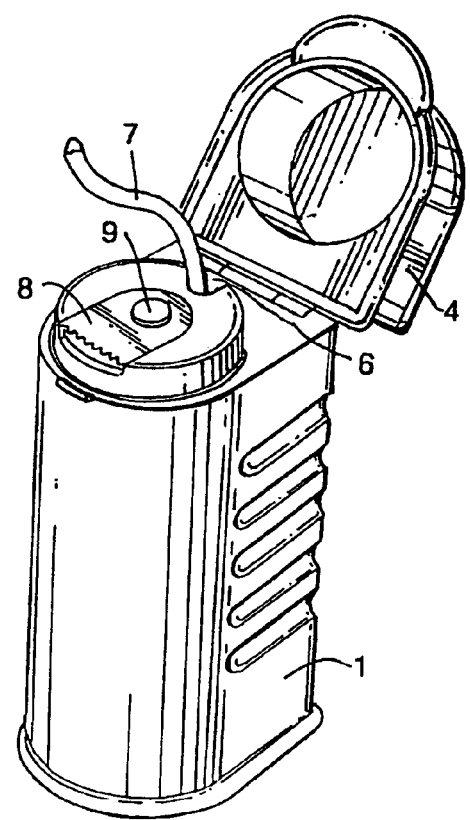
FIG. 2 is a similar view of the dispenser in the open (dispensing) position.
Figure 4:
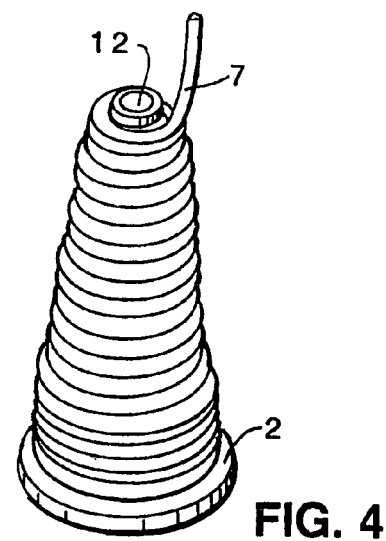
FIG. 4 is a view of a spool of coated yarn for use inside a dispenser of FIG. 1 or 2.
Figure 5:
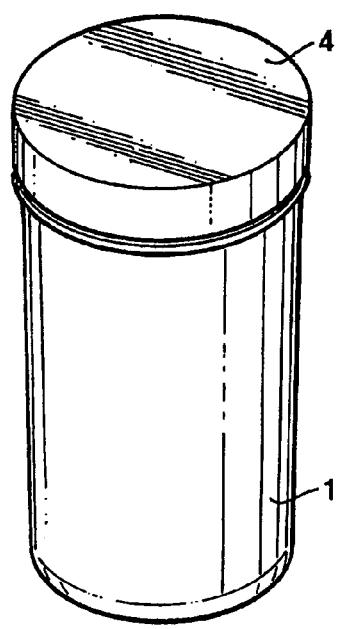
FIG. 5 is a perspective view of a second embodiment of a dispenser in the closed position.
Figure 6:
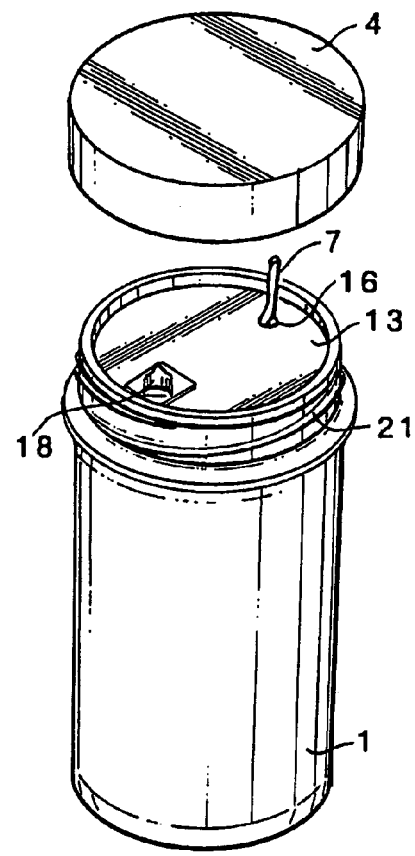
FIG. 6 is a similar view of the second embodiment in an open (dispensing) position.

As shown in FIGS. 1 and 2 the dispenser of the first embodiment comprises a body 1, suitably of plastics material, which is shaped to receive a spool 2 of coated yarn as shown in FIG. 4.

The dispenser has a cap portion 3 which fits tightly into the mouth at the top of the body 1 and a lid 4 which can be pivoted from a closed position as shown in FIG. 1 to the open position as shown in FIG. 2.

The cap portion 3 has a slot 5 in the edge which in combination with the body 1 defines a dispensing aperture 6 for withdrawing the coated yarn 7 from the spool 2. There is a cutting blade 8 secured by a rivet 9 on the top surface of the cap portion 3 for cutting the yarn when sufficient yarn has been withdrawn, in a manner similar to dental floss.

The cap portion 3 has a rib 10 around its skirt which seals against the top edge of the body 1. The lid 4 can be closed down around the cap portion 3 and forms a seal against the body 1 so that the dispensing aperture 6 can be closed over when it is not in use.

The spool has a base 11 which rests at the bottom of the interior of the body 1 and a spindle 12 which extends upwardly inside body 1 as far as the cap portion 3. The coated yarn 7 is spirally wound onto the spindle 12 so that it may be withdrawn as required.

Each spool may be disposable after use. The cap portion 3 can be lifted from the body 1 so that an empty spool may be removed and a refill spool can be installed after which the cap portion 3 is pushed back onto the body again. Thus, the dispenser can be re-used many times.

A plumber or other user can hold the body in one hand and pull the coated yarn from the aperture 6 to the desired length, after which the yarn is cut on the blade 8. These simple and quick operations facilitate easy handling of the dispenser and direct application of the coated yarn to the threaded pipe component.

FIGS. 5 to 8 show a second embodiment of a dispenser. Similar numerals are used for similar parts.

In the second embodiment the body 1 and the lid 4 are cylindrical. The lid 4 is not hinged to the body but forms a separate component, which has an internal screw thread to mate with an external screw thread 21 on the body 1. The cap portion 13 is also cylindrical and fits tightly into the mouth at the top of the body 1. The cap portion 13 has a dispensing aperture 16, which passes through it. A cutting blade 18, similar to that of a dental floss dispenser, projecting above the cap portion 13 and inclined thereto, is used for cutting the coated yarn 7.

Figure 8:
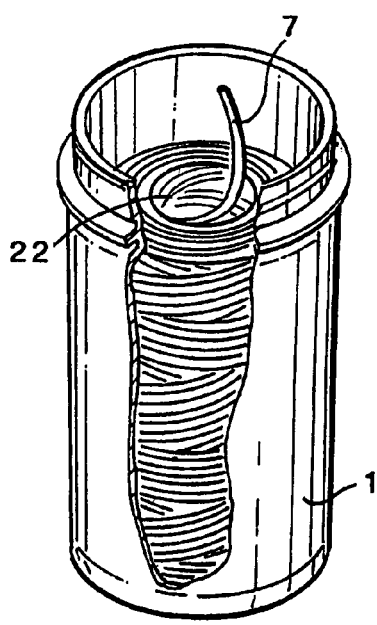
FIG. 8 is a view similar to FIG. 6 showing the body of the dispenser without the cap portion and partially cut away to show the yarn inside it.
Figure 7:
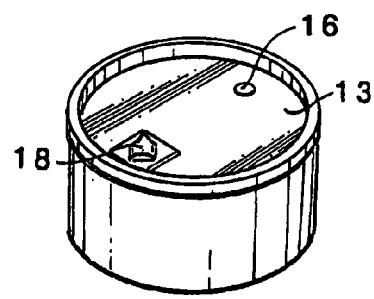
FIG. 7 is a detail view of a cap portion of the second embodiment.

As seen in FIG. 8, the dispenser does not use a spindle like that of FIG. 4. Instead the coated yarn is wound inside the body 1 using a winding technique such as is used in making a ball of string. The yarn can be unwound from an axial passage 22 formed when the yarn is deposited into the body.

Figure 3:
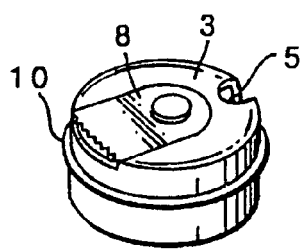
FIG. 3 is a detail view of a cap portion of the dispenser.

The first embodiment of FIGS. 1 to 3 may also be used without a spindle 12 but with the yarn wound inside the body in the manner of FIG. 8.

Several embodiments of a material according to the invention will now be described by way of example. Viscosity measurements in Examples 3 to 7 were made with a Haake PK100 viscometer, cone PK1, 2 degree, after 3 minutes at 20 revs. per second at 25° C.

The method for testing pipe joint sealing materials is described in European Standard EN 751-2: 1996 (British Standard BS EN 751-2: 1997) "Sealing materials for metallic threaded joints in contact with 1st, 2nd and 3rd family gases and hot water".

The invention will be further illustrated by the following non-limiting examples.

EXAMPLES

Example 1

A sealant composition was prepared as a paste using the following materials:

|  | % w/w |
| --- | --- |
| Linseed Oil | 60 |
| Polyethylene Powder | 6 |
| Calcium Carbonate | 34 |

Nylon thread of 2100 dtex was coated with this paste composition.

100 meters of the nylon thread was coated by passing it through the paste composition twice to give a coating of:

| Paste | 24 grms |
| --- | --- |
| Nylon Thread (100 meters) | 21 grms |

The proportions were therefore:

| Paste | 53.2% w/w |
| --- | --- |
| Nylon Thread | 46.8% w/w |

The coated thread was next wound onto a dispensing spool, for subsequent application to threaded pipe fittings.

An experimental assembly was created consisting of a number of screw-threaded couplings of iron pipe fittings of 1 inch (25 mm) outside diameter and of ½ inch (12.5 mm) outside diameter. The threadings of the couplings were of a taper-parallel nature as is typically used by the plumbing industry. One coupling had to be a 1 to ½ inch (25 mm to 12.5 mm) reducer. The assembly when complete had a total seal on one end and a connection capable of attaching a pressure line to the other end. The number of threaded connections on the assembly was four. This assembly when pressurized without the sealing material of the invention in the joints leaked when subjected to very low air pressure. However, when the coated thread of the invention was drawn from the dispenser and applied directly to the screw threads of the couplings (i.e., to the male components) by winding on a sufficient quantity to fill the troughs of about 3–5 screw threads of each coupling, and the female couplings connected on to complete the assembly, and the assembly was pressurized to 6 bar air pressure, no leakage occurred.

This demonstrated the satisfactory function of the thread sealant of the invention. The spool of coated thread is packed in an appropriate air-impermeable package prior to use.

Example 2

A sealant composition was prepared as a paste using the following materials:

|  | % w/w |
| --- | --- |
| Linseed oil | 36 |
| Polyethylene powder | 5 |
| Calcium carbonate | 59 |

The composition had a viscosity of 35,000 mPas when measured with a Brookfield RVT viscometer, spindle 5, 2.5 revs. per minute at 25° C.

The composition was applied to nylon thread of 2100 dtex as in Example 1. The coated thread was wound into the body of a dispenser. It was subsequently tested as described in Example 1.

Example 3

A sealant composition was prepared as a paste using the following materials:

|  | % w/w |
| --- | --- |
| Silicone oil* | 32.1 |
| Calcium carbonate | 67.9 |

*Silopren E2 from Bayer A.G.

The composition had a viscosity of 28,000 mPas.

Nylon thread of 2100 dtex was coated by passing it through this sealant composition to give a coating at a loading of 52% w/w sealing composition. The coated fibre weighed approximately 0.45 g per metre.

The coated thread was wound into the body of a dispenser for subsequent application to threaded pipe fittings. It did not require air-tight packaging.

The coated thread drawn from the dispenser was tested as described in Example 1.

Example 4

A sealant composition was prepared as a paste using the following materials:

|  | % w/w |
| --- | --- |
| Silicone oil* | 32.0 |
| Polyethylene powder | 6.0 |
| Calcium carbonate | 62.0 |

*Silopren E2 from Bayer A.G.

The composition had a viscosity of 29,200 mPas.

The composition was applied to nylon thread of 2100 dtex as in Example 3 at a loading of 60% w/w sealing composition. The coated fibre had a weight of approximately 0.53 g per metre.

The coated thread was wound into the body of a dispenser. It was subsequently tested as described in Example 1.

The paste composition of this Example was subjected to accelerated ageing for two months at 82° C. No weight loss was observed in the paste.

The coated thread of this Example was also aged for two months at 82° C., samples of the coated thread being packed in a closed plastic container or in a sealed glass container or being left open. The various samples were then tested for their sealing capability on threaded pipe joints. No difference was observed between the various samples or between the aged samples and unaged material. These test results indicate that the material based on silicone oil will not need to be stored in hermetically sealed containers or packaging.

Example 5

A sealant composition was prepared as a paste using the following materials:

|  | % w/w |
| --- | --- |
| Silicone oil* | 32.0 |
| Polytetrafluoroethylene powder | 4.0 |
| Polyethylene powder | 6.0 |
| Calcium carbonate | 58.0 |

*Silopren E2 from Bayer A.G.

The composition had a viscosity of 30,620 mPas.

The composition was applied to nylon thread of 2100 dtex as in Example 3 at a loading of 69% w/w sealing composition. The loaded yarn had a weight of 0.7 g per metre.

The coated thread was wound into the body of a dispenser. It was subsequently tested as described in Example 1.

Example 6

A sealant composition was prepared as a paste using the following materials:

|  | % w/w |
| --- | --- |
| Silicone oil* | 35 |
| Polyethylene powder | 14 |
| Calcium carbonate | 51 |

*Silopren E2 from Bayer A.G.

The composition was applied to nylon thread of 2100 dtex as in Example 3 at a loading of 63% w/w. The coated fibre had a weight of 0.57 g per metre.

The coated thread was wound into the body of a dispenser. It was subsequently tested as described in Example 1.

Example 7

A sealant composition was prepared as a paste using the following materials:

|  | % w/w |
| --- | --- |
| Liquid Paraffin | 60 |
| Polyethylene powder | 6 |
| Calcium carbonate | 34 |

The liquid paraffin was a standard product commercially available from the BDH catalogue. The composition had a viscosity of 20,000 mPas.

The composition was applied as in Example 2 and the coated thread was wound into the body of a dispenser. It was subsequently tested as described in Example 1.

The full scope of the invention is measured by the claims. What is claimed is:

1. A method for sealing a threaded assembly comprising:
providing a dispenser having a joint-sealing material packaged therein, wherein the joint-sealing material comprises a multifilament yarn and a joint-sealing composition ready coated over the yarn;
removing a portion of the joint-sealing material from the dispenser; and
applying the portion of the joint-sealing material to threads of a first threaded component of the threaded assembly.

2. The method of claim 1, wherein the first threaded component is a threaded male component.

3. The method of claim 1, wherein the first threaded component is a threaded pipe.

4. The method of claim 1, further comprising:
providing a second threaded component; and
screwing the second threaded component over the threads of the first threaded component.

5. The method of claim 4, wherein the second threaded component is a threaded female component.

6. The method of claim 1, wherein the step of removing a portion of the joint-sealing material from the dispenser further comprises:
pulling the portion of the joint-sealing material through an aperture of the dispenser; and
closing the aperture with a closure means.

7. The method of claim 1, further comprising the step of cutting the portion of the joint-sealing material to separate the portion from joint-sealing material remaining in the dispenser.

8. The method of claim 1, wherein the joint-sealing composition is a non curing paste.

9. The method of claim 8, wherein the joint-sealing composition comprises an oil and a filler, wherein the oil is selected from the group consisting of linseed oil, silicone oil, mineral oil, and combinations thereof.

10. The method of claim 8, wherein the filler is a calcium carbonate filler.

11. The method of claim 8, wherein the joint sealing composition has a viscosity from about 20,000 mPas to about 500,000 mPas.

12. The method of claim 1, wherein the joint-sealing composition is a curable polymeric composition.

13. A method for sealing a threaded assembly comprising:
providing a dispenser having a joint-sealing material packaged therein, wherein the joint-sealing material comprises a multifilament yarn and a joint-sealing composition ready coated over the yarn;
removing a portion of the joint-sealing material from the dispenser; and
applying the portion of the joint-sealing material to threads of a first threaded component of the threaded assembly, wherein the joint-sealing composition is a curable polymeric composition that comprises a reactive monomer selected from the group consisting of a mono-functional acrylate ester, a poly-functional acrylate ester, a monofunctional methacrylate ester, a poly-functional methacrylate ester and combinations thereof.

14. A method for sealing a threaded assembly comprising:
providing a dispenser having a joint-sealing material packaged therein, wherein the joint-sealing material comprises a multifilament yarn and a joint-sealing composition ready coated over the yarn;
removing a portion of the joint-sealing material from the dispenser; and
applying the portion of the joint-sealing material to threads of a first threaded component of the threaded assembly, wherein the joint-sealing composition comprises a hydroxyl-terminated polydimethyl siloxane and a filler.

15. The method of claim 12, wherein the joint-sealing composition further includes a filler.

16. The method of claim 1, wherein the yarn is a polyamide yarn or a polypropylene yarn.

* * * * *